United States Patent
Krompass

(10) Patent No.: US 11,685,229 B2
(45) Date of Patent: Jun. 27, 2023

(54) AIR FLAP STRUCTURE FOR A MOTOR VEHICLE AIR-CONDITIONING MODULE

(71) Applicant: Bayerische Motoren Werke Aktiengesellschaft, Munich (DE)

(72) Inventor: Andreas Krompass, Simbach am Inn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 273 days.

(21) Appl. No.: 16/441,354

(22) Filed: Jun. 14, 2019

(65) Prior Publication Data

US 2019/0291537 A1 Sep. 26, 2019

Related U.S. Application Data

(63) Continuation of application No. PCT/EP2017/077093, filed on Oct. 24, 2017.

(30) Foreign Application Priority Data

Dec. 15, 2016 (DE) ...................... 10 2016 225 074.4

(51) Int. Cl.
*B60H 1/00* (2006.01)
(52) U.S. Cl.
CPC ..... *B60H 1/00678* (2013.01); *B60H 1/00857* (2013.01); *B60H 2001/00707* (2013.01)
(58) Field of Classification Search
CPC ............ B60H 1/00678; B60H 1/00857; B60H 1/00671; B60H 1/00835; B60H 1/00664; B60H 2001/00707

(Continued)

(56) References Cited

U.S. PATENT DOCUMENTS 5,647,399 A * 7/1997 Andersen ........... B60H 1/00842
137/637.3
6,484,755 B1 * 11/2002 Schwarz ............ B60H 1/00678
137/637.3

(Continued)

FOREIGN PATENT DOCUMENTS

CN 1470407 A 1/2004
DE 196 03 944 C1 2/1997

(Continued)

OTHER PUBLICATIONS

International Search Report (PCT/ISA/210) issued in PCT Application No. PCT/EP2017/077093 dated Feb. 9, 2018 with English translation (six (6) pages).

(Continued)

*Primary Examiner* — Avinash A Savani
*Assistant Examiner* — Dana K Tighe
(74) *Attorney, Agent, or Firm* — Crowell & Moring LLP

(57) ABSTRACT

An air flap structure for a motor vehicle air-conditioning module includes at least two air outlet openings, a shaft, and a drive. The at least two air outlet openings each have an assigned closure flap configured to close and open the assigned air outlet opening. The shaft has therein the closure flaps arranged and is configured to rotate therewith. The closure flaps are rotatable into a closed and an opened position by a rotational movement of the shaft. The drive is configured to drive the shaft and configured to generate the rotational movement thereof. With respect to imaginary planes at both ends of the shaft, perpendicular to the shaft, the drive is arranged outside the axially outwardly facing sides of said two imaginary planes. A driving force of the drive is introduced onto the shaft exclusively between two adjacent air outlet openings of the at least two air outlet openings.

7 Claims, 3 Drawing Sheets

(58) Field of Classification Search
USPC .......................................................... 454/152
See application file for complete search history.

(56) References Cited

U.S. PATENT DOCUMENTS

| | | | | |
|---|---|---|---|---|
| 9,033,775 B2* | 5/2015 | Kleinow | ................. | F16H 53/02 |
| | | | | 454/152 |
| 2003/0233843 A1 | 12/2003 | Ueda | | |
| 2009/0241574 A1 | 10/2009 | Ozeki et al. | | |

FOREIGN PATENT DOCUMENTS

| DE | 100 02 023 A1 | 8/2001 | | |
|---|---|---|---|---|
| DE | 10 2005 015 739 A1 | 12/2005 | | |
| DE | 60 2004 007 338 T2 | 3/2008 | | |
| DE | 10 2013 200 939 A1 | 7/2014 | | |
| DE | 102013200939 A1 * | 7/2014 | ........... | B60K 11/085 |
| DE | 102014106307 A1 * | 11/2015 | ......... | B60H 1/00842 |
| DE | 10 2015 108 316 A1 | 12/2016 | | |
| EP | 2 149 464 A1 | 2/2010 | | |
| FR | 2 897 926 A1 | 8/2007 | | |
| WO | WO 2015/169589 A1 | 11/2015 | | |

OTHER PUBLICATIONS

German-language Written Opinion (PCT/ISA/237) issued in PCT Application No. PCT/EP2017/077093 dated Feb. 9, 2018 (five (5) pages).
German-language Search Report issued in counterpart German Application No. 10 2016 225 074.4 dated Oct. 19, 2017 with partial English translation (13 pages).
Chinese-language Office Action issued in Chinese Application No. 201780077398.0 dated Dec. 31, 2021 with English translation (14 pages).

* cited by examiner

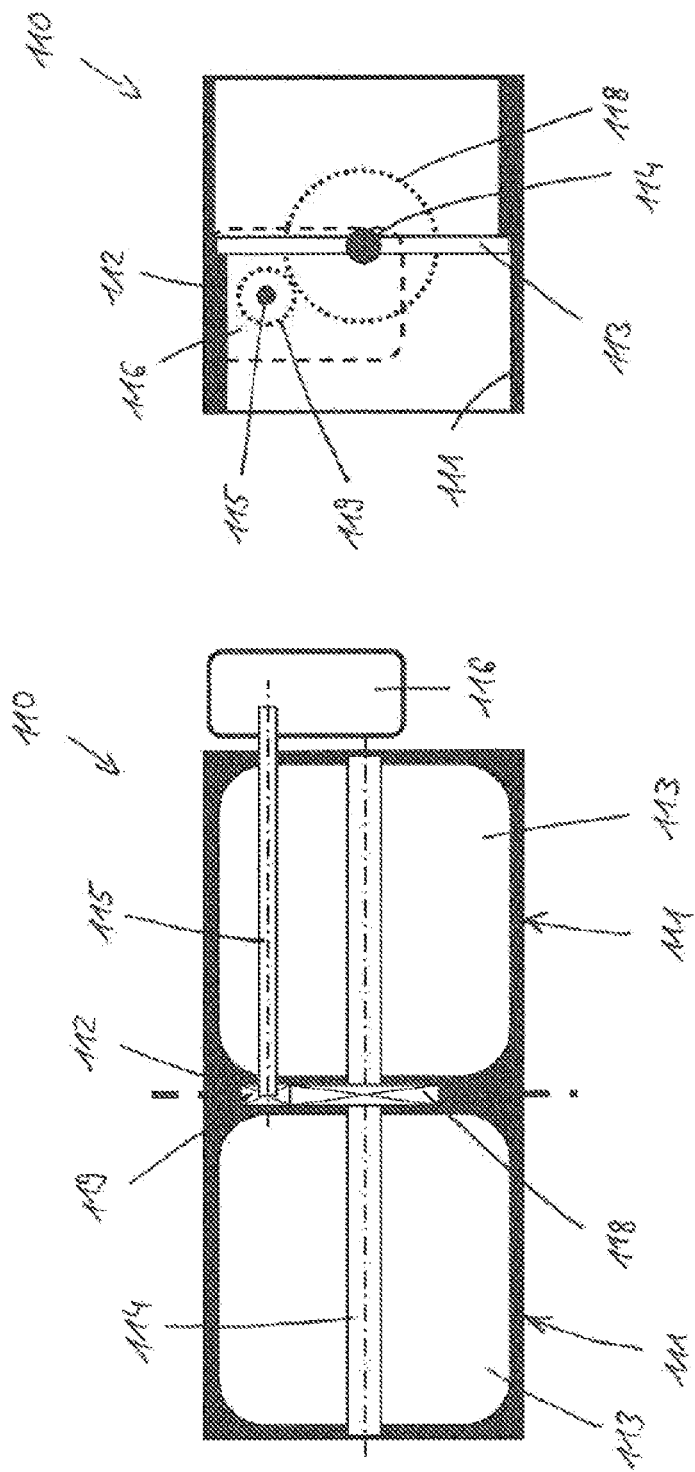

AIR FLAP STRUCTURE FOR A MOTOR VEHICLE AIR-CONDITIONING MODULE

CROSS REFERENCE TO RELATED APPLICATIONS

This application is a continuation of PCT International Application No. PCT/EP2017/077093, filed Oct. 24, 2017, which claims priority under 35 U.S.C. § 119 from German Patent Application No. 10 2016 225 074.4, filed Dec. 15, 2016, the entire disclosures of which are herein expressly incorporated by reference.

BACKGROUND AND SUMMARY OF THE INVENTION

Embodiments of the invention relate to an air flap structure for a motor vehicle air-conditioning module, comprising air outlet openings which can be closed and opened by means of a closure flap.

Motor vehicle air-conditioning modules heat or cool air supplied to the passenger compartment of a vehicle, and correspondingly mix the air and divide the air into different zones (e.g., footwell, windshield, head region, etc.). Such a motor vehicle air-conditioning module is disclosed, for example, in EP 2 149 464 A1 (referred to there as an air conditioning assembly). Such an air-conditioning module has air outlet openings which can be opened and closed by means of rotatably mounted flaps (e.g., the flaps 42, 44 and 46 in EP 2 149 464 A1). In the case of such air outlet openings, a plurality of air outlet openings are frequently arranged adjacent to one another, as illustrated in FIGS. 1A and 1B. Each air outlet opening 1a, 1b is assigned a dedicated closure flap 2a, 2b; for example one of said air outlet openings conducts air to the driver's footwell and the adjacent air outlet opening conducts air to the front passenger's footwell. The closure flaps 2a, 2b of said mutually adjacent air outlet openings 1a, 1b are arranged on a common shaft 3 which is driven by a driver 4 (e.g., actuator, coupling rod or Bowden cable) into which the force is introduced at one end of the shaft 3; for example, an actuator is arranged at one end of the shaft 3. Force is therefore introduced into the shaft 3 in the form of a torque (as indicated by the arrow) on one side, which leads to the shaft 3 and the closure flaps 2a, 2b fastened thereto undergoing an increasing torsion along the axial length of the shaft 3 as far as the end furthest away from the drive. Such a torsion, even though it is relatively small, leads, as can be seen in FIG. 1B, to the air outlet opening 1b already being closed by the closure flap 2b whereas the air outlet opening 1a is still slightly open because the closure flap 2a is not yet completely closed. In practice, this could lead to, for example, no air being conducted into the driver's footwell while air still continues to be blown into the front passenger's footwell. It has hitherto been attempted to counteract this problem by means of an asymmetrical geometry of the housing sealing surface such that the flaps geometrically undergo more overcompression the further the sealing point is arranged from the drive, but this leads to the flaps closing at different speeds during a closing operation, which in turn can lead to, for example, no air being conducted into the driver's footwell while air continues to still be blown into the front passenger's footwell.

It is an object of the embodiments of the invention to at least partially solve this problem. This object is achieved by the inventive air flap structure, the motor vehicle air-conditioning module, and the motor vehicle disclosed herein. Advantageous developments are also disclosed herein.

According to one exemplary embodiment of the invention, an air flap structure for a motor vehicle air-conditioning module, comprising at least two air outlet openings, each having an assigned closure flap for closing and opening the assigned air outlet opening; a shaft on which the closure flaps are arranged for rotation therewith, in particular in an even number, wherein the closure flaps are rotatable into a closed and an opened position by a rotational movement of the shaft; a drive for driving the shaft and for generating the rotational movement thereof, wherein, with respect to imaginary planes at both ends of the shaft, perpendicular to the shaft, the drive is arranged outside the axially outwardly facing sides of said two imaginary planes, wherein a driving force of the drive is introduced onto the shaft exclusively, in particular centrally, between two adjacent air outlet openings, in particular the two centrally arranged air outlet openings, of the at least two air outlet openings. This location of introducing force is preferably the center of the shaft. This exemplary embodiment affords the advantage that the drive can continue to be arranged laterally, i.e., at one end of the shaft, but by force being introduced between the closure flaps, in particular by force being introduced centrally, a symmetrical flap drive mechanism is provided which does not lead to an uneven opening of two adjacent closure flaps. Even should torsion occur, this is then symmetrical, and therefore an uneven distribution of air between, for example, the driver's side and front passenger's side, does not occur.

According to a further exemplary embodiment of the invention, the shaft extends through the center of the closure flaps.

According to a further exemplary embodiment of the invention, the shaft is a hollow shaft, through the interior of which a driveshaft extends, said driveshaft being connected at one end to the drive and at the other end, in order to introduce the driving force of the drive into the shaft, is connected to the latter between two adjacent air outlet openings of the at least two air outlet openings.

According to a further exemplary embodiment of the invention, the air flap structure is designed in such a manner that the shaft between two adjacent air outlet openings of the at least two air outlet openings is provided with a gearwheel, a chain wheel, a belt wheel or a lever connection, via which the driving force is introduced onto the shaft, wherein the gearwheel, chain wheel, belt wheel or the lever connection is driven in turn by a driveshaft which extends substantially parallel to the shaft and is connected to the drive.

Furthermore, the embodiments of the invention also provide a motor vehicle air-conditioning module comprising an air flap structure, and a motor vehicle comprising such a motor vehicle air-conditioning module.

Other objects, advantages and novel features of the embodiments of the present invention will become apparent from the following detailed description of one or more preferred embodiments when considered in conjunction with the accompanying drawings, in which:

BRIEF DESCRIPTION OF THE DRAWINGS

FIG. 3A is a schematic front view of an air flap structure according to an embodiment of the invention.

FIG. 3B is a schematic side view of the air flap structure from FIG. 3A.

DETAILED DESCRIPTION OF THE DRAWINGS

Figure 1A:
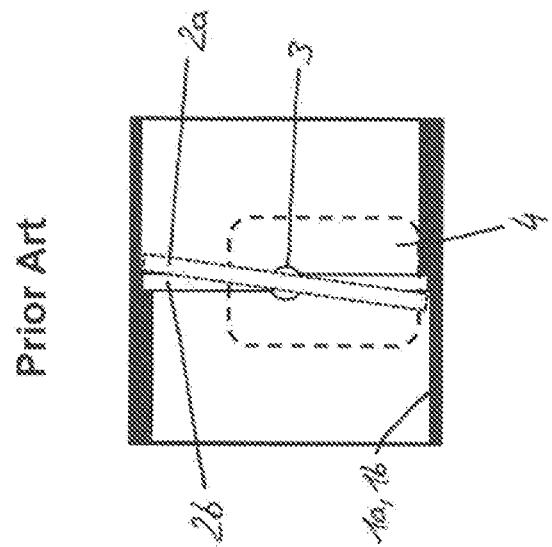
FIG. 1A is a schematic front view of an air flap structure from the prior art.
Figure 1B:
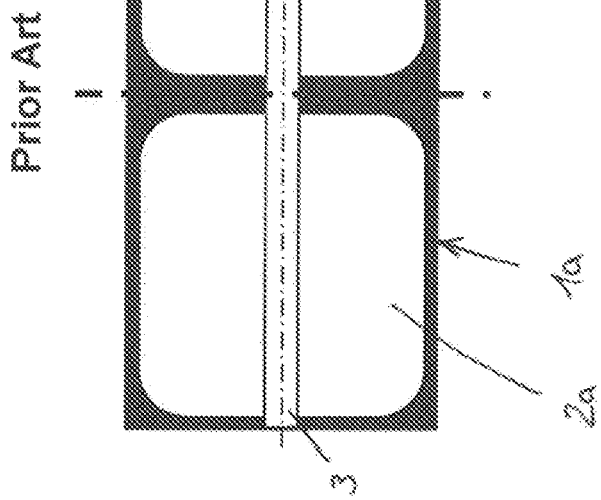
FIG. 1B is a schematic side view of the air flap structure from FIG. 1A.
Figure 2B:
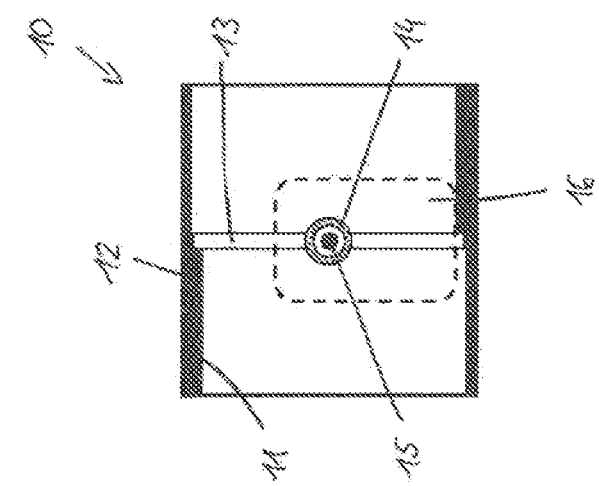
FIG. 2B is a schematic side view of the air flap structure from FIG. 2A.
Figure 2A:
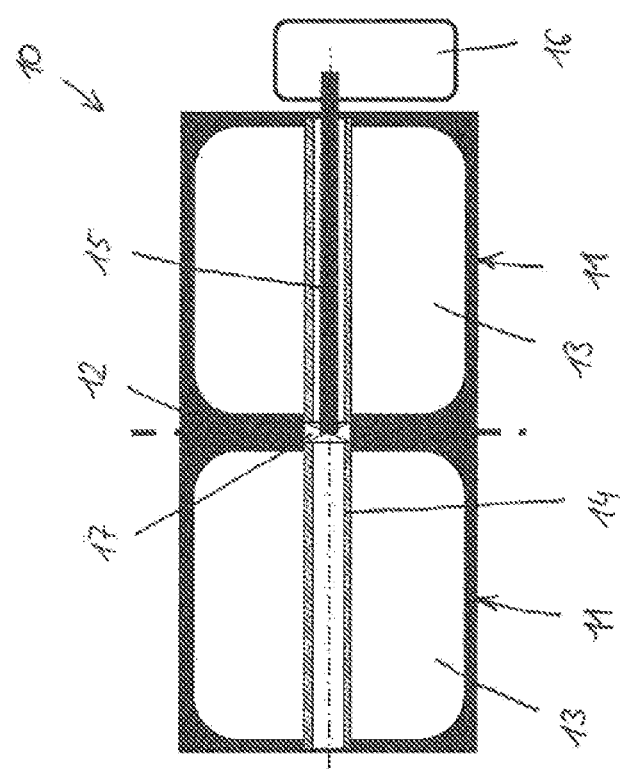
FIG. 2A is a schematic front view of an air flap structure according to an embodiment of the invention.

FIG. 2A shows a schematic front view of an air flap structure 10 according to an exemplary embodiment of the invention and FIG. 2B shows a schematic side view of said air flap structure. Two adjacent air outlet openings 11 are illustrated. Said air outlet openings 11 are openings in a housing 12 of a vehicle air-conditioning module (not illustrated) and serve for supplying air from the vehicle air-conditioning module into a passenger compartment. The vehicle air-conditioning module comprises at least one fan for generating an airflow, a cooling unit, a heating unit and devices for mixing cooled and heated air. These elements of the vehicle air-conditioning module are accommodated in the housing 12. Such a vehicle air-conditioning module is disclosed in EP 2 149 464 A1 and are referred to there as an air conditioning assembly.

Each of the air outlet openings 11 is assigned to a certain air supply zone, such as, for example, the driver's footwell, front passenger's footwell, rear seat bench footwell on the left, rear seat bench footwell on the right, windshield, dashboard ventilation on the left, dashboard ventilation on the right, dashboard ventilation in the center, etc. The zones assigned to the adjacent air outlet openings 11 are preferably zones which are symmetrical in the passenger compartment, i.e., a footwell on the driver's side and front passenger's side or the dashboard ventilation on the right and left side. Two air outlet openings 11 are illustrated in the situation illustrated, but also more mutually adjacent air outlet openings 11 can be provided; there are preferably an even number of mutually adjacent air outlet openings 11, for example four, six, eight, etc. In the event that more than two air outlet openings 11 are provided, the two air outlet openings 11 illustrated are the two centrally arranged air outlet openings of said multiplicity of adjacent air outlet openings.

The at least two mutually adjacent air outlet openings 11 are each assigned an air flap or closure flap 13 which either completely closes or completely opens the assigned air outlet opening 11 (intermediate positions are likewise possible). In the closed state, the closure flaps 13 are substantially perpendicular to an airflow direction of the air outlet openings 11, whereas, in a completely opened state, they are substantially parallel to the airflow direction. FIGS. 2A and 2B illustrate the closure flaps 13 in a closed state. The closure flaps 13 of all of the mutually adjacent air outlet openings 11 are arranged on a shaft 14 and are connected to the latter for rotation therewith. In the present exemplary embodiment, the shaft 14 is a hollow shaft which is mounted rotatably at both ends with respect to the air outlet openings 11. The shaft 14 can be formed integrally or divided into a plurality of sections, but in the latter case, all of the sections are fixedly connected to one another, in particular for rotation with one another. In the interior of the shaft 14 extends a driveshaft 15 which is connected at one end to a drive 16 and is connected at its other end to the shaft 14 via a connection element 17. The connection between the driveshaft 15 and the shaft 14 is arranged between the two adjacent air outlet openings 11 or between the two adjacent closure flaps 13. Said air outlet openings 11 and closure flaps 13 are in particular the two centrally arranged air outlet openings 11 and closures flaps 13. The driving force of the drive 16 is therefore introduced via the driveshaft 15 into the center of the shaft 14, specifically introduced exclusively at this location. An intermediate space is formed between the driveshaft 15 and the inner side of the shaft 14. The connecting element 17 is connected both fixedly to the driveshaft 15 and also fixedly to the inner side of the shaft 14. The drive 16 is positionally fixed with respect to the housing 12 and the air outlet openings 11. The drive 16 is preferably an actuator, but it can also be the driven element of a Bowden cable or of a coupling rod. The described manner of introduction of force makes it possible for the drive 16 to be arranged, as before, laterally with respect to the air outlet openings 11, i.e., at one end of the shaft 14, or, in more precise terms, with respect to imaginary planes at both ends of the shaft 14, perpendicular to the shaft 14, the drive 16 is arranged outside the axially outwardly facing sides of said two imaginary planes.

FIG. 3A shows a schematic front view of an air flap structure 110 according to an exemplary embodiment of the invention, and FIG. 3B shows a schematic side view of said air flap structure. Only the differences over the embodiments will be described below in order to avoid repetitions. Reference is furthermore made to the previous description. The air flap structure 110 has air outlet openings 111 in a housing 112, said air outlet openings being provided with closure flaps 113. In respect of the air outlet openings 111, the housing 112 and the closure flaps 113, reference is made to the description of the air outlet openings 11, the housing 12 and the closure flaps 13 of the exemplary embodiment previously disclosed. The closure flaps 113 are connected to a shaft 114 as has been described in conjunction with the shaft 14 of the exemplary embodiment previously disclosed. However, in contrast to the exemplary embodiment previously disclosed, the shaft 114 is not necessarily a hollow shaft, but rather is preferably a solid material shaft. Furthermore, a drive 116 is provided for which the description of the drive 16 applies. A driving force of the drive 116 is introduced into the shaft 114 at the same location of the shaft 114 as described in the exemplary embodiment previously disclosed. However, instead of a connecting element 17, a gearwheel 118 is provided in this variant, said gearwheel being fixedly connected to the shaft 114. The gearwheel 118 is driven by a driving gearwheel 119 which is in engagement with the gearwheel 118 and which, like the gearwheel 118, is arranged between the air outlet openings 111 or between the closure flaps 113. The driving gearwheel 119 is provided at one end of a driveshaft 115 which is connected at its other end to the drive 116. The driveshaft 115 preferably extends substantially parallel to the shaft 114. Instead of a gearwheel connection of the gearwheels 118, 119, a chain connection with corresponding chain wheels, a belt drive with corresponding belt wheels, or a lever connection, i.e., an articulation lever with a corresponding coupling or a coupling rod, can also be provided.

While the embodiments of the invention have been illustrated and described in detail in the drawings and the preceding description, this illustration and description should be understood as illustrative or by way of example and not as limiting, and it is not intended to restrict the invention to the exemplary embodiments disclosed. The fact that certain features are mentioned in various dependent claims is not intended to indicate that a combination of said features could not also be advantageously used.

The foregoing disclosure has been set forth merely to illustrate the embodiments of the invention and is not intended to be limiting. Since modifications of the disclosed embodiments incorporating the spirit and substance of the invention may occur to persons having ordinary skill in the art, the invention should be construed to include everything within the scope of the appended claims and equivalents thereof.

What is claimed is:

1. An air flap structure for a motor vehicle air-conditioning module, comprising:
    at least two air outlet openings, each having an assigned closure flap configured to close and open the assigned air outlet opening;
    a shaft on which the closure flaps are arranged configured to rotate therewith, wherein the closure flaps are rotatable into a closed and an opened position by a rotational movement of the shaft;
    a drive configured to drive the shaft and configured to generate the rotational movement thereof, wherein
        with respect to imaginary planes at both ends of the shaft, perpendicular to the shaft, the drive is arranged outside axially outwardly facing sides of said two imaginary planes,
        a driving force of the drive is introduced onto the shaft exclusively between two adjacent air outlet openings of the at least two air outlet openings via a driveshaft, and
        the driveshaft extends in an interior of the shaft, the driveshaft being directly connected at a first end thereof to a drive and being connected at a second end thereof, opposite to the first end, to the shaft via a fixed mechanical connection, the drive positionally fixed with respect to a housing in which the air flap structure is disposed, and the drive is a driven element of a Bowden cable.

2. The air flap structure according to claim 1, wherein the driving force is introduced onto the shaft exclusively in a center of the shaft.

3. The air flap structure according to claim 2, wherein the shaft extends through a center of the closure flaps.

4. The air flap structure according to claim 3, wherein the shaft is a hollow shaft, through an interior of which a driveshaft extends, said driveshaft being connected at one end to the drive and at an opposite end, in order to introduce the driving force of the drive into the shaft, is connected to a latter between the two adjacent air outlet openings of the at least two air outlet openings.

5. The air flap structure according to claim 3, wherein the shaft between the two adjacent air outlet openings of the at least two air outlet openings is provided with a gearwheel, a chain wheel, a belt wheel or a lever connection, via which the driving force is introduced onto the shaft, wherein the gearwheel, chain wheel, belt wheel or the lever connection is driven in turn by a driveshaft which extends substantially parallel to the shaft and is connected to the drive.

6. A motor vehicle air-conditioning module comprising an air flap structure according to claim 5.

7. A motor vehicle comprising a motor vehicle air-conditioning module according to claim 6.

* * * * *